United States Patent
Zanghelini

(10) Patent No.: US 10,498,186 B2
(45) Date of Patent: Dec. 3, 2019

(54) CAP FOR A ROTATING ELECTRIC MACHINE

(71) Applicant: Weg Equipamentos Elétricos S.A., Jaraguá do Sul (BR)

(72) Inventor: Mauricio Zanghelini, Jaraguá do Sul (BR)

(73) Assignee: WEG EQUIPAMENTOS ELÉTRICOS S.A., Jaraguádo Sul (BR)

( * ) Notice: Subject to any disclaimer, the term of this patent is extended or adjusted under 35 U.S.C. 154(b) by 0 days.

(21) Appl. No.: 15/917,018

(22) Filed: Mar. 9, 2018

(65) Prior Publication Data

US 2018/0262077 A1 Sep. 13, 2018

Related U.S. Application Data

(60) Provisional application No. 62/469,951, filed on Mar. 10, 2017.

(51) Int. Cl.
| | |
|---|---|
| *F16C 25/08* | (2006.01) |
| *F16C 35/04* | (2006.01) |
| *H02K 5/173* | (2006.01) |
| *F16C 37/00* | (2006.01) |
| *H02K 5/15* | (2006.01) |
| *H02K 15/14* | (2006.01) |
| *F16C 35/077* | (2006.01) |
| *F16C 27/04* | (2006.01) |

(Continued)

(52) U.S. Cl.
CPC ............. *H02K 5/15* (2013.01); *F16C 25/08* (2013.01); *F16C 27/04* (2013.01); *F16C 35/042* (2013.01); *F16C 35/077* (2013.01); *F16C 37/007* (2013.01); *H02K 5/1732* (2013.01); *H02K 15/14* (2013.01); *F16C 2300/32* (2013.01); *F16C 2380/26* (2013.01); *H02K 5/1672* (2013.01); *H02K 15/12* (2013.01)

(58) Field of Classification Search
CPC ...... F16C 27/04; F16C 35/042; F16C 35/067; F16C 35/077; F16C 25/04; F16C 37/007; F16C 5/1672; F16C 33/58; F16C 2300/32; F16C 2380/26; F16C 25/08; H02K 5/1732; H02K 15/12; H02K 5/27
USPC ............... 384/418, 434, 456, 513, 543, 558; 310/51, 89, 91

See application file for complete search history.

(56) References Cited

U.S. PATENT DOCUMENTS 2,064,741 A * 12/1936 Frank ...................... B21B 31/07
 72/246
3,304,802 A * 2/1967 Siegfried .............. F01D 25/164
 464/180

(Continued)

FOREIGN PATENT DOCUMENTS

CA 2706032 A1 * 12/2010 ............... H02K 5/20
DE 2104452 A1 * 8/1972 ............ F16C 35/077

(Continued)

*Primary Examiner* — Marcus Charles
(74) *Attorney, Agent, or Firm* — B. Aaron Shulman, Esq.; Stites & Harbison, PLLC

(57) ABSTRACT

A cap for a rotating electric machine, the cap comprising at least a rolling bearing receiving portion (2) for receiving a rolling bearing (R) having an outer race (E), the rolling bearing receiving portion (2) comprising a radially resilient central portion (3) configured to exert pressure on the outer race (E) of the rolling bearing.

4 Claims, 3 Drawing Sheets

(51) Int. Cl.
*H02K 5/167* (2006.01)
*H02K 15/12* (2006.01)

(56) References Cited

U.S. PATENT DOCUMENTS

| | | | | | |
|---|---|---|---|---|---|
| 4,549,823 | A | * | 10/1985 | Nichting | F16C 27/066 |
| | | | | | 384/537 |
| 8,129,874 | B2 | * | 3/2012 | Lambka | H02K 5/20 |
| | | | | | 310/53 |
| 8,421,298 | B2 | * | 4/2013 | Horng | F04B 35/04 |
| | | | | | 310/215 |
| 9,431,881 | B2 | * | 8/2016 | Clendenen | H02K 11/33 |
| 2005/0093381 | A1 | * | 5/2005 | Ionel | H02K 1/143 |
| | | | | | 310/49.01 |
| 2006/0006094 | A1 | * | 1/2006 | Hofmann | H02K 5/10 |
| | | | | | 206/706 |
| 2006/0152096 | A1 | * | 7/2006 | Helmi | H02K 5/15 |
| | | | | | 310/90 |
| 2010/0264762 | A1 | * | 10/2010 | Dautel | F01P 5/02 |
| | | | | | 310/64 |
| 2010/0287995 | A1 | * | 11/2010 | Mancini | D06F 37/262 |
| | | | | | 68/139 |
| 2012/0223604 | A1 | * | 9/2012 | Hennecke | H02K 11/33 |
| | | | | | 310/71 |
| 2014/0159524 | A1 | * | 6/2014 | Stoinski | H02K 5/15 |
| | | | | | 310/89 |
| 2015/0333589 | A1 | * | 11/2015 | De Filippis | H02K 5/10 |
| | | | | | 310/71 |
| 2016/0036299 | A1 | * | 2/2016 | Hayashi | H02K 9/22 |
| | | | | | 310/64 |

FOREIGN PATENT DOCUMENTS

DE 29717415 U1 * 2/1999 ............... H02K 5/10
WO WO-2008029036 A1 * 3/2008 ............ H02K 5/141

* cited by examiner

CAP FOR A ROTATING ELECTRIC MACHINE

FIELD OF THE INVENTION

The present invention relates to a cap for a rotating electric machine and, more specifically, to a cap having a rolling bearing receiving portion.

BACKGROUND OF THE INVENTION

Rotating electrical machines are widely known in the art, and basically comprise a static part (stator) and a rotating part (rotor). In a simplified manner, the stator comprises a plurality of plates stacked and pressed to form a block or package, known as the stator core. These plates are commonly called stator blades.

In some constructions of electric machines, the caps of the electrical machine are attached to the stator block by rivets. This construction requires a careful observation of the concentricity between the cap and the stator, so that the assembly is achieved within a suitable tolerance threshold.

As known by those skilled in the art, the caps of the rotating electric machines have a central portion intended to receive the rolling element bearing.

This housing must be machined with extreme precision to prevent the rolling bearing from radially moving inside the cavity. In the solutions known in the art, an additional part, such as a bushing or a bushing, may be used to ensure interference between the outer race of the bearing and the inner face of the bearing hub (housing) in the cover. Such additional parts can wear out, causing unwanted vibration in the machine and leading to need for maintenance.

The present invention seeks to provide a cap for a rotating electric machine which eliminates the need for precise machining of the rolling bearing housing.

The present invention also seeks to provide a cap for a rotating electric machine which maintains the rolling bearing secure even under the working temperature.

The present invention also seeks to provide a cap for a rotating electric machine which assists in ensuring concentricity between the bearing and the region (central bore) that accommodates the rotor in the stator of the machine.

SUMMARY OF THE INVENTION

The present invention achieves the above objectives by means of a cap for a rotating electric machine, the cap comprising at least one rolling bearing receiving portion for receiving a rolling bearing having an outer race, wherein the rolling bearing receiving portion comprises a radially resilient central portion configured to exert pressure on the outer race of the rolling bearing.

Preferably, the radially resilient central portion comprises a plurality of wall segments arranged to form a circular central portion.

The cap comprises a circular perimetric portion and a plurality of connecting segments extending between the circular perimetric portion and the radially resilient central portion.

Each connecting segment comprising a first end connected to the circular perimetric portion and a second end split into two portions, with a first portion attached to one of the wall segments of the radially resilient central portion and a second portion attached to an adjacent of the wall segments of the radially resilient central portion.

The first and second split parts of each connecting segment form between them a gap configured to receive a projection of an alignment device.

The cap may further comprise at least one contact portion configured to contact a stator of the rotating electric machine, wherein the contact portion comprises a contact end which contacts the stator of the rotating electric machine.

BRIEF DESCRIPTION OF THE DRAWINGS

The present invention will be described below in more detail with reference to the accompanying drawings, in which.

DETAILED DESCRIPTION OF THE INVENTION

Figure 1:
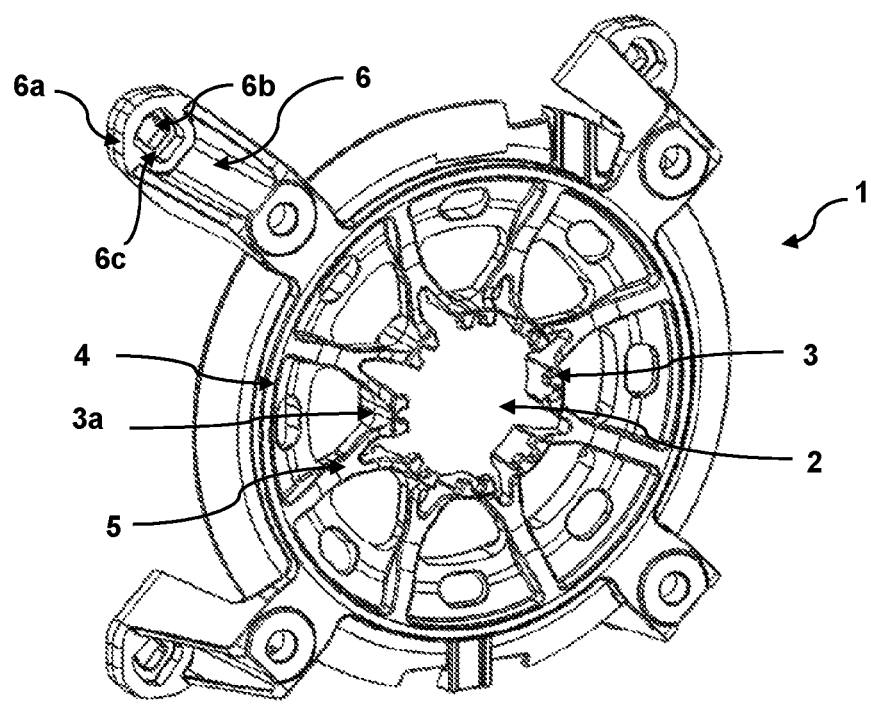
FIG. 1—is a top perspective view of a cap according to an embodiment of the present invention.
Figure 2:
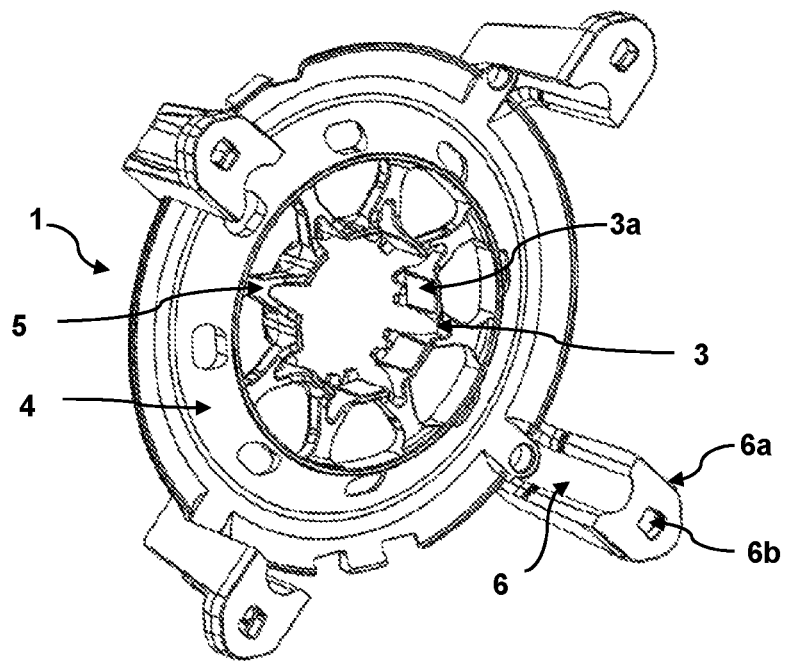
FIG. 2—is a bottom perspective view of a cap according to an embodiment of the present invention.

The present invention will be described hereinafter based on examples of preferred embodiments shown in FIGS. 1 to 6.

The present invention relates to a cap for a rotating electric machine of the type comprising a static part (stator) and a rotating part (rotor). The operation and components of such an electric machine are well known in the art.

Although the present disclosure is performed with reference to an electric motor, it is to be understood that the cap of the present invention could be applied to any rotating electric machine where there is a closure between the cap and stator.

As known to those skilled in the art, the electric machine may have caps attached to the stator block. This assembly or locking process between the cap (or caps) and the stator is commonly called a closure.

FIGS. 1 to 5 show an embodiment of a cap 1 according to the present invention. The cap 1 is preferably formed with a body in one piece, by an injection process. The preferred material is aluminum; however, any suitable material could be used.

The cap of the present invention is designed so as to improve the concentricity between the bearing and the bore that accommodates the rotor in the stator of the machine when closing the cap and the stator.

Thus, the cap 1 comprises a rolling bearing receiving portion 2 with a geometry that allows the alignment between the rotor and the stator to be made on the basis of the outer race (E) of a rolling bearing already accommodated in the receiving portion 2.

That is, the cap 1 is designed and constructed so that, once accommodated, the rolling bearing—such as a ball bearing—is visible in the cap, which allows aligning between the stator bore and the outer race E of the rolling bearing, significantly improving the concentricity.

The geometry of the rolling bearing receiving portion 2 is designed so as to maintain the bearing under pressure in the outer race E so as to avoid the rotation of the outer race E with the inner face of the receiving portion and, consequently avoid the damage that could be caused.

As show in the figures, the rolling bearing receiving portion 2 comprises a radially resilient central portion 3 configured to exert pressure on the outer race E of the rolling bearing. In the embodiment shown in the figures, the radially resilient central portion 3 is an integral part of the single piece body of the cap 2.

The resilient central portion 3 comprises a plurality of wall segments 3a arranged to form a circular central portion. The wall segments 3a may further comprise axial rests 6b, which serve as a backup in case of an axial displacement of the bearing. In this sense, it should be emphasized that the axial rests are optional and not necessary to the proposed inventive concept.

Figure 4:
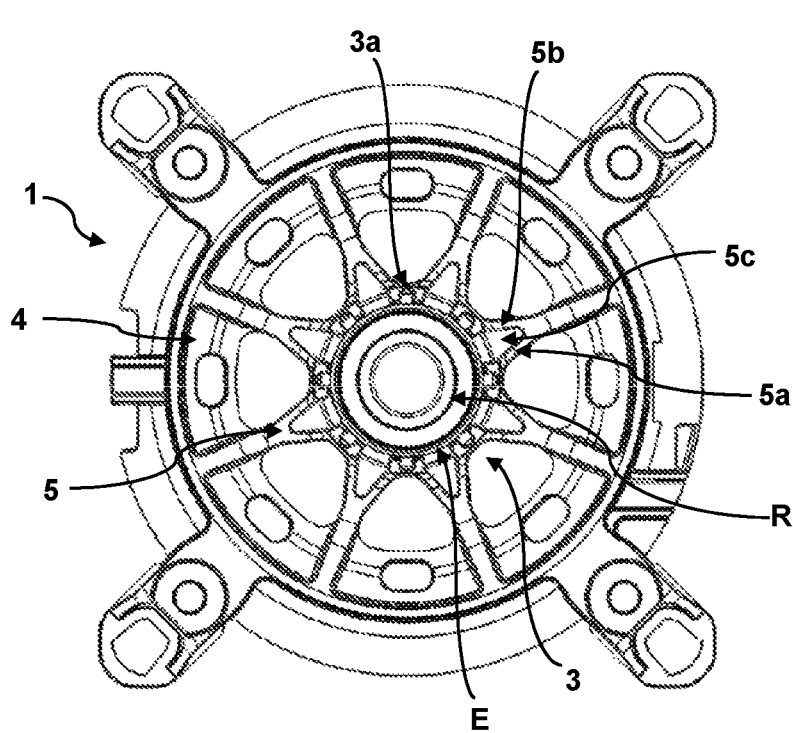
FIG. 4—is a top view of a cap according to an embodiment of the present invention, with a rolling bearing shown in the rolling bearing receiving portion.
Figure 5:
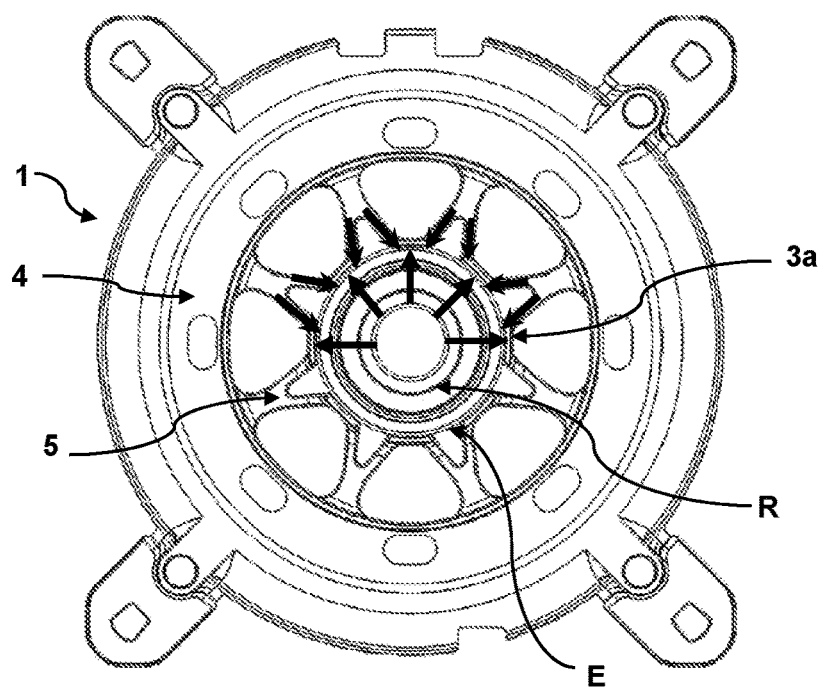
FIG. 5—is a bottom view of a cap according to an embodiment of the present invention, with a rolling bearing shown in the rolling bearing receiving portion.

FIGS. 4 and 5 are top and bottom views illustrating a rolling bearing R disposed in the rolling bearing receiving portion 2, FIG. 5 including dark arrows showing the pressure exerted by the wall segments 3a of the radially resilient central portion 3 on the outer race E of the bearing and the opposing forces exerted by the bearing on the wall segments 3a.

As is clear from these figures, the natural elasticity of the receiving portion 2 allows absorbing all dimensional variations of the injected cap, in addition to absorbing the dimensional variation due to changes in ambient and working temperatures, while maintaining the rolling bearing under pressure in the outer race E and avoiding its rotation.

The elasticity or resiliency of the receiving portion 2 is achieved by the geometry of the cap, which comprises a circular perimetric portion 4 and a plurality of connecting segments 5 extending between the circular perimetric portion 4 and the radially resilient central portion 3.

Thus, in the present invention, the cap 1 has a balance between the elastic deformations expected in the bearing housing region 2 within the elastic deformation limits of the material (e.g., aluminum), ensuring that the outer bearing race E is secured both at ambient temperature, as well as at working temperature, and also within the limits of stresses/deformations occurring during the operation of the assembled motor assembly. This effect is achieved by dimensioning the region of the bearing assembly so that the region absorbs the dimensional differences through the elastic deformation of the material, in this case the aluminum, within the limits of the elastic deformation range.

In fact, the cap 1 and rolling bearing receiving portion 2 have elastic properties to accommodate the rolling bearing and hold the rolling bearing thereon and prevent rotation of the outer race. In contrast, the cap 1 and the rolling bearing receiving portion 2 must have sufficient mechanical strength to withstand the operation stresses and not deform excessively. Thus, the geometry of the rolling bearing receiving portion 2 absorbs possible deformations, ensuring the fixed positioning between the outer race E of the rolling bearing R and the inner face of the rolling bearing receiving portion 2.

Figure 3:
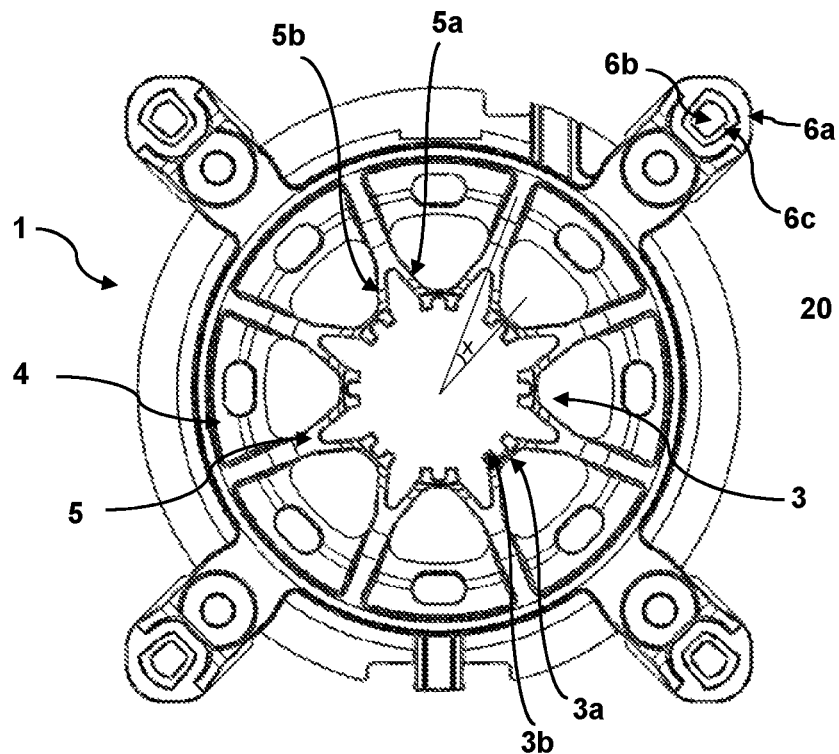
FIG. 3—is a top view of a cap according to an embodiment of the present invention.

Preferably, as can be seen in FIGS. 3 and 4, each connecting segment 5 comprises a first end attached to the circular perimetric portion 4 and a second split end, with a first portion 5a attached to a first of the wall segments 3a of the radially resilient central portion 3 and a second portion 5b attached to one adjacent of the wall segments 3a.

In one embodiment of the invention, the angle x between a plane passing longitudinally by the connecting segment and a plane passing transversely across the middle of the wall segment is between 20° and 25° and more specifically 22.50°.

As shown in the drawings, in one embodiment the radially resilient central portion 3 has 8 (eight) wall segments 3a and 8 (eight) connecting segments 5.

Figure 6:
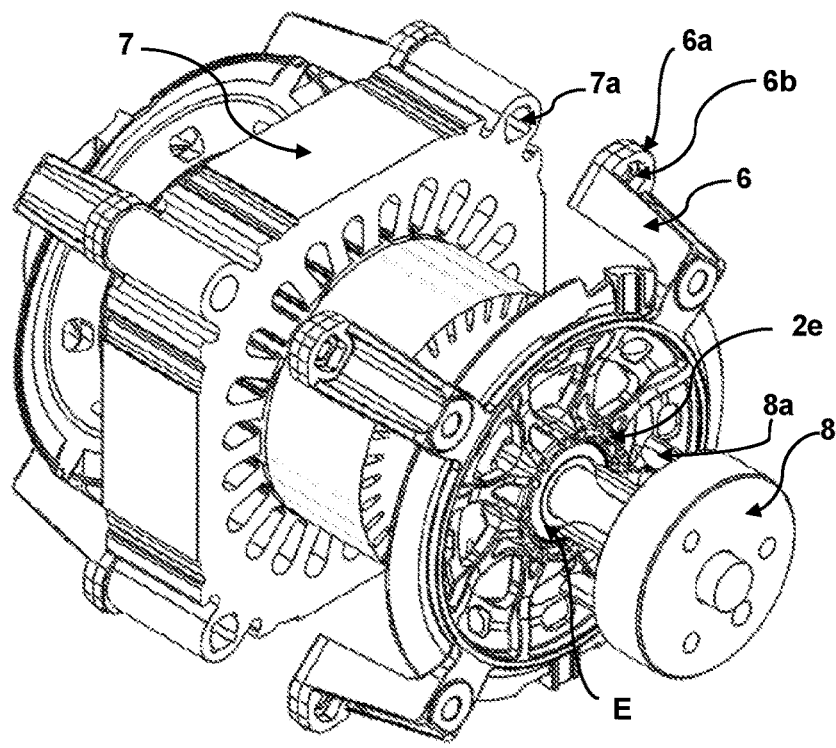
FIG. 6—is a schematic illustration of the closure between a cap and a stator, wherein there is further shown an alignment device used during closure.

In the embodiment show in the figure, the cap has at least one contact portion 6 formed to contact the stator core 7 for closing (attachment) between the parts (see FIG. 6).

The contact portion 6 may be configured for locking with the stator by any suitable means, such as rivets or mechanical deformations.

Thus, although in the embodiment shown in the figures, the locking is by injection of a polymer (as will be explained below), it is an optional construction which could be replaced by rivet fixing through the end of the portion or by mechanical deformation of the end of the contact portion when pressed against a corresponding bore of the stator.

In the embodiment shown in the figures, the end 6a of the contact portion 6 comprises at least one through-hole 6b. As shown in the figures, the contact portion 6 may comprise a leg 6 and the end 6a may comprise, for example, a flat wall 6a with the through-hole 6b. It should be emphasized, however, that the contact portion could be a continuous wall or even spaced wall segments.

As shown in FIG. 6, the stator comprises a stator core 7 formed mainly by a plurality of stator blades. The detailed construction of this kind of stator is known to those skilled in the art and will not be discussed here.

The stator 7 is preferably manufactured of steel, but other materials could be used. The stator has at least one region with a closure hole 7a. The closure hole 7a defines a substantially tubular inner wall. Preferably, the stator has four closure holes 7a, and each hole is disposed spaced from one another, for example, at the corners of the stator 7.

Naturally, when the stator 7 has non-rectangular blades, the holes are arranged in a spaced configuration in the vicinity of the edges of the plates.

In the embodiment shown in the figures, each cap 1 has four contact legs 6. However, the number of legs could be greater or lesser depending on the design of the contact portion. Naturally, the number of closure holes of the stator 7 may also vary, so that each contact leg 6 corresponds to a closure hole of the stator.

Additionally, in the embodiment shown in the figures, the four contact legs 6 are arranged spaced apart such that each leg is close to each of the stator 7 core corners when mounting the assembly. In this case, the stator core 7 has a corresponding closure hole in each corner.

Naturally, when the stator 7 is formed by circular or non-rectangular blades, the contact legs 6 will be arranged in spaced locations so that they can match the stator holes.

In the embodiment shown in the figures, during assembly for the closing between the stator 7 and the cap 2, the through-hole 6b is substantially aligned with the closure hole 7a. Thus, for the closure, i.e., for the attachment of the cap 2 to the stator 1, a polymer P is injected through the through-hole 6b into the closure hole 7a.

The polymer used may be any suitable polymer such as, for example, the Technyl® A 216 polymer.

As best shown in FIGS. 3 and 4, preferably the contact legs 6 have a polymer receiving portion 6c proximate to the through-hole 6b. The receiving portion 6c may take the form of a recess at the end 6a, the recess surrounding the edge of the through-hole 6b.

Thus, for the locking, the polymer P fills the through-hole 1a and the polymer receiving portion 6c, locking together the cap and the stator.

The injected polymer secures the cap to its position, so that the polymer absorbs all variations in the positioning. In addition, with the use of the polymer as a fastener, there is no need for riveting of the parts nor for the use of an additional fastening element (such as a screw or the like).

The inner wall of the closure hole 7a may include recesses which function as regions for anchoring the injected polymer, so that the differences in the coefficient of thermal expansion of the stator metallic material (steel) and plastic do not affect the dimension of the assembly, avoiding relative displacements between the different materials when heated due to the motor operating temperature.

It should be noted that while the embodiment shown in the figures shows the contact portions 6 configured for polymer fixation, the cap of the present invention could be secured to the stator by rivets or any other suitable means, without prejudice to the proposed inventive concept.

FIG. 6 shows how the closure process occurs, with the use of an alignment device 8, which helps to achieve the desired positioning (concentricity).

One of the main advantages obtained with the present invention is the possibility of significantly improving the concentricity between the bearing R and the rotor accommodating bore 7a of the stator 7. This concentricity is significantly improved by the fact that the geometry of the rolling bearing receiving portion 2 allows the alignment to be made with reference to the outer race E of the rolling bearing already accommodated in the receiving portion 2. That is, since the rolling bearing is visible on the cap, it is possible to align the stator bore with the outer race E of the rolling bearing itself, significantly improving concentricity.

Thus, the process comprises aligning, with the aid of the aligning device 8, the cap 1 with the stator 7 so that the outer race E of the rolling bearing is aligned and concentric with the rotor accommodating bore and the through-hole 2c is aligned with the closure hole 1a. The reference to the alignment is the outer face E of the rolling bearing.

After alignment, the polymer P is injected through the through-hole 6b into the inner wall 7a of the closure hole.

In that sense, as shown in FIG. 6, the alignment device 8 includes projections 8a, so that, upon alignment, each projection 8a is disposed in a gap (5c) formed between the end portions 5a, 5b of the bipartite end of the connecting segment 5. With this, the tool is able to position itself in the vicinity of the bearing receiving portion 2, so that the alignment is done with the outer race E of the bearing received in the receiving portion 2.

Thus, the construction of the cap 1, in addition to maintaining the bearing under pressure in the outer race E and helping to ensure concentricity of the rolling bearing, aids the closing process, allowing the correct arrangement of the alignment device 8.

Having described examples of the preferred embodiments of the closure system of the present invention, it should be understood that the scope of the present invention encompasses other possible variations of the inventive concept described, being limited solely by the wording of the appended claims, including the possible equivalents.

The invention claimed is:

1. A cap for a rotating electric machine, the cap comprising at least a rolling bearing receiving portion for receiving a rolling bearing having an outer race, the rolling bearing receiving portion comprises a radially resilient central portion configured to exert pressure on the outer race of the rolling bearing,
   wherein the radially resilient central portion comprises a plurality of wall segments arranged to form a circular central portion,
   wherein the cap further comprises a circular perimetric portion and a plurality of connecting segments extending between the circular perimetric portion and the radially resilient central portion, and
   wherein each connecting segment comprises a first end connected to the circular perimetric portion and a second end split into two parts, with a first part connected to one of the wall segments of the radially resilient central portion and a second part attached to one adjacent of the wall segments of the radially resilient central portion.

2. The cap according to claim 1, wherein the first and second parts of each connecting segment form between them a gap configured to receive a projection of an alignment device.

3. The cap according to claim 2, further comprising at least one contact portion configured to contact a stator of the rotating electric machine.

4. The cap according to claim 3, wherein the at least one contact portion comprises a contacting end which contacts a stator of the electric machine.

* * * * *